US012755105B2

(12) United States Patent
Seo

(10) Patent No.: US 12,755,105 B2
(45) Date of Patent: Oct. 6, 2026

(54) DEVICE AND METHOD FOR ARTIFICIAL INTELLIGENCE REASONING BASED ON LANGUAGE MODEL

(71) Applicant: ELECTRONICS AND TELECOMMUNICATIONS RESEARCH INSTITUTE, Daejeon (KR)

(72) Inventor: Young-Ae Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 18/904,441

(22) Filed: Oct. 2, 2024

(65) Prior Publication Data

US 2025/0165718 A1 May 22, 2025

(30) Foreign Application Priority Data

Nov. 16, 2023 (KR) ........................ 10-2023-0159132

(51) Int. Cl.
*G06F 40/00* (2020.01)
*G06F 40/35* (2020.01)

(52) U.S. Cl.
CPC .................................... *G06F 40/35* (2020.01)

(58) Field of Classification Search
CPC ...... G06F 40/30; G06F 16/3329; G06F 40/35; G06F 40/284; G06F 16/3344; G06F 40/289; G06F 40/20; G06F 40/56; G06F 40/253; G06F 16/90332; G06F 40/10; G06N 20/00; G06N 3/09; G06N 3/08; G06N 3/045;

(Continued)

(56) References Cited

U.S. PATENT DOCUMENTS

2021/0357749 A1 11/2021 Kim
2023/0161973 A1 5/2023 Heo et al.
2023/0394328 A1* 12/2023 Wei ........................ G06N 5/022

(Continued)

FOREIGN PATENT DOCUMENTS

JP 2022-159039 A 10/2022
KR 10-2476104 B1 12/2022
KR 10-2023-0097710 A 7/2023

OTHER PUBLICATIONS

Zhang, Z., Zhang, A., Li, M., & Smola, A. (2022). Automatic chain of thought prompting in large language models. arXiv 2022. arXiv preprint arXiv:2210.03493. (Year: 2022).*

(Continued)

*Primary Examiner* — Edgar X Guerra-Erazo
(74) *Attorney, Agent, or Firm* — LRK PATENT LAW FIRM

(57) ABSTRACT

Provided are a device and method for artificial intelligence (AI) reasoning based on a language model. The method for AI reasoning based on a language model includes generating a question core summary by inputting a natural language question to a language model, decomposing the natural language question into sub-questions using a reasoning model on the basis of the question core summary and the natural language question, obtaining an answer to the natural language question by solving the sub-questions and synthesizing solutions of the sub-questions.

12 Claims, 18 Drawing Sheets

(58) Field of Classification Search
CPC ........ G06N 5/022; G06N 5/04; G06N 3/0455; G06N 3/0475
See application file for complete search history.

(56) References Cited

U.S. PATENT DOCUMENTS

| | | | | |
|---|---|---|---|---|
| 2024/0354319 | A1* | 10/2024 | Dinu | G06F 16/3329 |
| 2024/0370658 | A1* | 11/2024 | Zhang | G06F 40/242 |

OTHER PUBLICATIONS

Radford, A., Narasimhan, K., Salimans, T., & Sutskever, I. (2018). Improving language understanding by generative pre-training ( Year: 2018).*

Jason Wei et al., "Chain-of-Thought Prompting Elicits Reasoning in Large Language Models", 36th Conference on Neural Information Processing Systems (NeurIPS 2022), arXiv:2201.11903v6 [cs. CL] Jan. 10, 2023.

Luyu Gao et al., "PAL: Program-aided Language Models", arXiv:2211.10435v2 [cs.CL] Jan. 27, 2023.

Wenhu Chen et al., "Program of Thoughts Prompting: Disentangling Computation from Reasoning for Numerical Reasoning Tasks", arXiv:2211.12588v3 [cs. CL] Nov. 29, 2022.

Denny Zhou et al., "Least-to-Most Prompting Enables Complex Reasoning in Large Language Models", Feb. 1, 2023, ICLR 2023.

James Xu Zhao et al., "Automatic Model Selection with Large Language Models for Reasoning," Findings of the Association for Computational Linguistics: EMNLP 2023, pp. 758-783, Dec 6-10, 2023, arXiv:2305.14333.

Zhuosheng Zhang et al., "Automatic Chain of Thought Prompting in Large Language Models", arXiv 2210.03493v1, pp. 1-25, (Oct. 7, 2022).

Jingzhe Ding et al., "Using Large Language Model to Solve and Explain Physics Word Problems Approaching Human Level", arXiv 2309.08182v2, pp. 1-9, (Sep. 20, 2023).

* cited by examiner

FIG. 3

RELATED ART

```
# Question: Toulouse has twice as many sheep as Charleston.
Charleston has 4 times as many sheep as Seattle. How many
sheep do Toulouse, Charleston, and Seattle have together if
Seattle has 20 sheep?
#Answer this question by implementing a solver() function.
def solver():
    # Let's write a Python program step by step, and then return
the answer
    # Firstly, we need define the following variable:
```

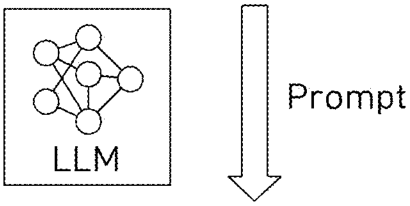

```
Seattle = 20
Charleston = Seattle * 4
Toulouse = Charleston * 2
# Then, we need to calculate the sum of the three
sum = Seattle + Charleston + Toulouse
# Finally, we need to return the answer
return sum
```

FIG. 6

Toulouse has twice as many sheep as Charleston.
Charleston has 4 times as many sheep as Seattle.
How many sheep do Toulouse, Charleston,
and Seattle have together if Seattle has 20 sheep?

FIG. 7

```
def solution():
Seattle = 20
Charleston Seattle * 4
Toulouse = Charleston * 2
# Then, we need to calculate the sum of the three
sum Seattle + Charleston + Toulouse
# Finally, we need to return the answer
```

FIG. 8

```
number_of_Toulouse's_sheep number_of_Charleston's_sheep * 2
number_of_Charleston's_sheep = number_of_Seattle's_sheep * 4
number_of_Seattle's_sheep = 20
total_number_of_sheep = ?
```

FIG. 9 number_of_Toulouse's_sheep number_of_Charleston's_sheep *2
→ Toulouse has twice as many sheep as Charleston.

number_of_Charleston's_sheep number_of_Seattle's_sheep* 4
→ Charleston has 4 times as many sheep as Seattle.

number_of_Seattle's_sheep = 20
→ Seattle has 20 sheep total_number_of_sheep = ?
→ How many sheep do Toulouse, Charleston, and Seattle have together?

FIG. 10

```
Seattle = 20
→ Seattle is 20

Charleston Seattle * 4
→ Charleston is 4 times as many as Seattle

Toulouse Charleston * 2
→ Toulouse is 2 times as many as Charleston

# Then, we need to calculate the sum of the three
Sum = Seattle + Charleston + Toulouse
Sum is the sum of Seattle, Charleston and Toulouse

# Finally, we need to return the answer
return Sum
```

FIG. 11

A piece of square paper has a perimeter of 32 centimeters. Nicky's dog, Rocky, tore off 1/4 of the paper. What is the area of the remaining paper?

FIG. 12

```
def solution():
    perimeter = 32
    fraction_torn 1/4
    area_total (perimeter/4) ** 2
    area_remaining = (1- fraction_torn)* area_total
    result area_remaining
    return result
```

FIG. 13C

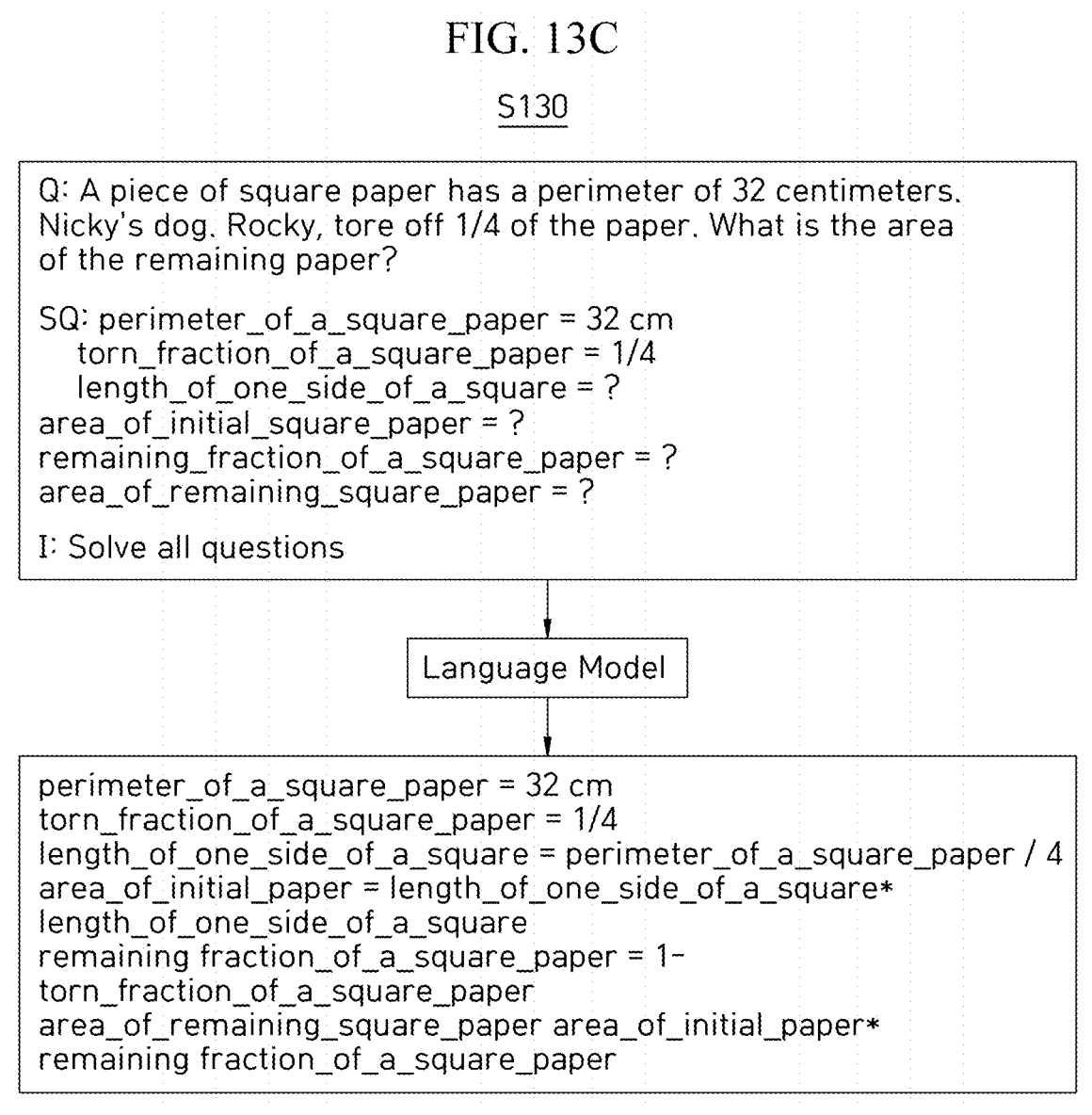

S130

Q: A piece of square paper has a perimeter of 32 centimeters. Nicky's dog, Rocky, tore off 1/4 of the paper. What is the area of the remaining paper?

SQ: perimeter_of_a_square_paper = 32 cm
torn_fraction_of_a_square_paper = 1/4
length_of_one_side_of_a_square = ?
area_of_initial_square_paper = ?
remaining_fraction_of_a_square_paper = ?
area_of_remaining_square_paper = ?

I: Solve all questions

Language Model perimeter_of_a_square_paper = 32 cm
torn_fraction_of_a_square_paper = 1/4
length_of_one_side_of_a_square = perimeter_of_a_square_paper / 4
area_of_initial_paper = length_of_one_side_of_a_square* length_of_one_side_of_a_square
remaining fraction_of_a_square_paper = 1- torn_fraction_of_a_square_paper
area_of_remaining_square_paper area_of_initial_paper* remaining fraction_of_a_square_paper

FIG. 14 perimeter_of_a_square_paper = 32 cm
torn_fraction_of_a_square_paper = 1/4
area_of_remaining_square_paper = ?

FIG. 15 perimeter_of_a_square_paper = 32 cm
torn_fraction_of_a_square_paper = 1/4
length_of_one_side_of_a_square = ?
area_of_initial_paper = ?
remaining_fraction_of_a_square_paper = ?
area_of_remaining_paper = ?

FIG. 16

```
perimeter_of_a_square_paper = 32 cm
torn_fraction_of_a_square_paper = 1/4
length_of_one_side_of_a_square perimeter_of_a_square_paper / 4
area_of_initial_paper = length_of_one_side_of_a_square* length_of_one_side_of_a_square
remaining_fraction_of_a_square_paper = 1 - torn_fraction_of_a_square_paper
area_of_remaining_paper area_of_initial_paper * remaining_fraction_of_a_square_paper
```

DEVICE AND METHOD FOR ARTIFICIAL INTELLIGENCE REASONING BASED ON LANGUAGE MODEL

CROSS-REFERENCE TO RELATED APPLICATION

This application claims priority to and the benefit of Korean Patent Application No. 10-2023-0159132, filed on Nov. 16, 2023, the disclosure of which is incorporated herein by reference in its entirety.

BACKGROUND

1. Field of the Invention

The present invention relates to a device and method for artificial intelligence (AI) reasoning based on a language model.

2. Description of Related Art

Deep learning pretrained language models are general-purpose models that learn the grammar and semantics of a language from tens to hundreds of gigabytes (GB) or more of textual data and are applied to a variety of application tasks. Recently, pretrained language models have been utilized in a number of detailed natural language processing tasks, such as automatic translation, dialog processing, document summarization, and the like, to significantly improve performance. Like this, an improvement in language model performance directly leads to an improvement in the performance of application tasks, and thus research is being conducted in various aspects to improve language model performance.

Recently, large language models (LLMs) that outperform existing language models, such as ChatGPT, GPT-4, and the like, have been developed and applied to various fields. The representative technique for utilizing an LLM for an actual application task is prompt engineering. Prompt engineering which is also known as in-context prompting, is a method of adjusting behavior of an LLM by providing specific input values to the LLM without updating model weights and thereby guiding the behavior of the LLM in a desired direction to achieve a desired result using the LLM which is difficult to fine-tune for a downstream task.

Recently, it has been discovered that LLMs have reasoning abilities, and research is actively being conducted to cause LLMs to perform reasoning tasks by applying a prompting technique to the LLMs. Some of the related studies showing good performance are a study of reasoning based on a language model called chain-of-thought (CoT) prompting and follow-up studies. According to a CoT prompting method, a CoT prompt that describes an intermediate reasoning step in a natural language is provided to a language model as a hint before actual question answering so that an LLM can utilize its inherently learned inference ability well to answer an actual inference question.

FIG. 1 is a diagram in which model inputs and outputs of the existing prompting method and a CoT prompting method are compared (Jason Wei, et al. 2022. "Chain-of-Thought Prompting Elicits Reasoning in Large Language Models," NeurIPS 2022). The left side of FIG. 1 shows a model input and output of the existing prompting method, and the right side shows a model input and output of the CoT prompting method.

In reasoning, the logical progression of a solution is important. As a method of improving multi-step reasoning performance in a CoT-based reasoning method, a study of decomposing a question that will be answered into intermediate questions that will be answered for the question and then solving each of the sub-questions without directly making an inference for the question that will be finally answered has been conducted.

FIG. 2 is an example diagram of complex reasoning employing problem decomposition (Zhou et al. 2023. "Least-to-Most Prompting Enables Complex Reasoning in Large Language Models," ICLR 2023). As shown in FIG. 2, the complex reasoning method includes a first operation of decomposing a question and a second operation of sequentially answering the sub-questions. Specifically, in stage 1, the question that will be answered "Q: It takes Amy 4 minutes to climb to the top of a slide. It takes her 1 minute to slide down. The water slide closes in 15 minutes. How many times can she slide before it closes?" is decomposed into sub-questions, such as "How long does each trip take?," without directly making an inference unlike what is shown in FIG. 1, and in stage 2, the sub-questions are sequentially answered to increase accuracy in multi-step reasoning.

Programming code has the characteristic of decomposing a question into operations and describing each operation to answer the question. As a method based on the characteristic of programming code, according to a reasoning method employing a language model for generating program code, such as Program of Thoughts (PoT) prompting (Chen et al. 2022) or Program-Aided Language models (PAL) (Gao et al. 2022), programing code is generated in an intermediate operation to enable an LLM to answer a natural language inference question and achieve the robustness, interpretability, and the like of reasoning operation. This method also has the advantage of using an LLM to answer an inference question described in a natural language, performing complex reasoning through a program code generation process, and eliminating calculation errors by separating mathematical calculations from reasoning through a Python interpreter or the like.

FIG. 3 is an example diagram of prompting proposed with PoT in which Python code for generating a correct answer to a mathematical problem in a natural language is generated (Chen et al. 2022. "Program of Thoughts Prompting: Disentangling Computation from Reasoning for Numerical Reasoning Tasks," arXiv:2211.12588).

A CoT-based method is strong in natural language processing, and a PAL-based method is strong in reasoning clarity and number processing. Meanwhile, to utilize the advantages of both CoT-based method and PAL-based language models, an ensemble method of using both the language models and selecting one of CoT-based and PAL-based inference results has been proposed and shows good performance on mathematical problem solving evaluation sets. FIG. 4 is an example diagram of solving an inference question using the both (Zhao et al. 2023. "Automatic Model Selection with Large Language Models for Reasoning," arXiv:2305.14333).

The representative dataset for evaluating inference performance is grade school math 8K (GSM8K). GSM8K is an 8.5K dataset of various high-quality grade school narrative mathematical problems. These problems require two to eight steps to solve, and the process of solving the problems involves performing a series of basic calculations mainly using basic arithmetic operations (addition, subtraction, multiplication, and division) to reach the final answer. Accordingly, GSM8K is useful for learning and measuring a multi-step mathematical reasoning ability. The research "Automatic Model Selection with Large Language Models for Reasoning" employing several LLMs shows a high accuracy of 96.5% for GSM8K.

However, according to current techniques that utilize language models to answer such inference questions, a question is input to a language model, and then a reasoning process is directly performed to answer the question without sufficient consideration of whether the question described in a natural language is correctly understood. In this process, when an error L1 ("result=cost_per_contact") of FIG. 4 or the like occurs, it is not possible to determine whether the error is due to the language model's incorrect understanding of the question or an inference error in the reasoning process. Also, the current techniques are only focused on increasing accuracy, and thus intermediate operations may be omitted or compressively contract to perform reasoning, which leads to difficulties in understanding the intermediate reasoning process. For example, in a reasoning process (B) of FIG. 4, a portion L2 ("discounted_box_cost=box_cost*(1−discount)") describes the calculation of a discount rate and the calculation of a price according to the discount rate together, which may lead to difficulties in estimating an inference error and understanding the reasoning process.

SUMMARY OF THE INVENTION

The present invention is directed to providing a device and method for artificial intelligence (AI) reasoning based on a language model in which, in inferring a correct answer to a question described in a natural language using a language model, an operation of summarizing and organizing the key content of the given question is performed to improve the understanding of the question and the explainability of operations of a reasoning process and increase accuracy in inference question answering and the clarity of detailed reasoning operations.

Objects of the present invention are not limited to those described above, and other objects which have not been described may be clearly understood by those of ordinary skill in the art from the following description.

According to an aspect of the present invention, there is provided a method for AI reasoning based on a language model, the method including inputting a natural language question to a pretrained language model to generate a question core summary, decomposing the natural language question into sub-questions using a reasoning model on the basis of the question core summary and the natural language question, and solving the sub-questions and synthesizing solutions of the sub-questions to obtain an answer to the natural language question.

The decomposing of the natural language question into the sub-questions may include decomposing the natural language question into one or more sub-questions, and each of the sub-questions may correspond to one reasoning operation.

The question core summary may be a semi-code-style summary.

The solutions of the sub-questions may be in the form of semi-code.

The method may further include, when the solutions of the sub-questions are in the form of semi-code, generating a final result by converting the solutions into program code and executing the program code.

The generating of the final code may further include processing unit information.

According to another aspect of the present invention, there is provided a device for AI reasoning based on a language model including a memory configured to store computer-readable instructions and at least one processor configured to execute the instructions.

When the instructions are executed, the at least one processor may generate a question core summary by inputting a natural language question to a pretrained language model, decompose the natural language question into sub-questions using a reasoning model on the basis of the question core summary and the natural language question, solve the sub-questions, and obtain an answer to the natural language question by synthesizing solutions of the sub-questions.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is an example diagram of prompting proposed with Program of Thoughts (PoT) in which Python code for generating a correct answer to a mathematical problem in a natural language is generated;

FIG. 6 is a diagram of an example of a mathematical problem described in a natural language;

FIG. 7 is a diagram of an example of generating Phyton code according to PoT;

FIG. 8 is a diagram of an example of generating a code-style summary of the present invention;

FIG. 9 is a diagram of an example of alignment between a code-style summary generation result of the present invention and a question;

FIG. 10 is a diagram of an example of connection between example code generated through PoT and a question;

FIG. 11 is a diagram of an example of a narrative mathematical problem that will be decomposed into sub-questions;

FIG. 12 is a diagram of an example of generating Python code according to Program-Aided Language models (PAL);

FIGS. 13A to 13C are diagrams of an example of operation-specific reasoning according to the present invention;

FIG. 14 is a diagram of an example of a code-style summary generated through a question core summarization operation according to the present invention;

FIG. 15 is a diagram of an example of semi-code including sub-questions generated through a question decomposition operation according to the present invention;

FIG. 16 is a diagram of an example of semi-code including solutions generated through a question answering operation according to the present invention.

DETAILED DESCRIPTION OF EXEMPLARY EMBODIMENTS

Figure 1:
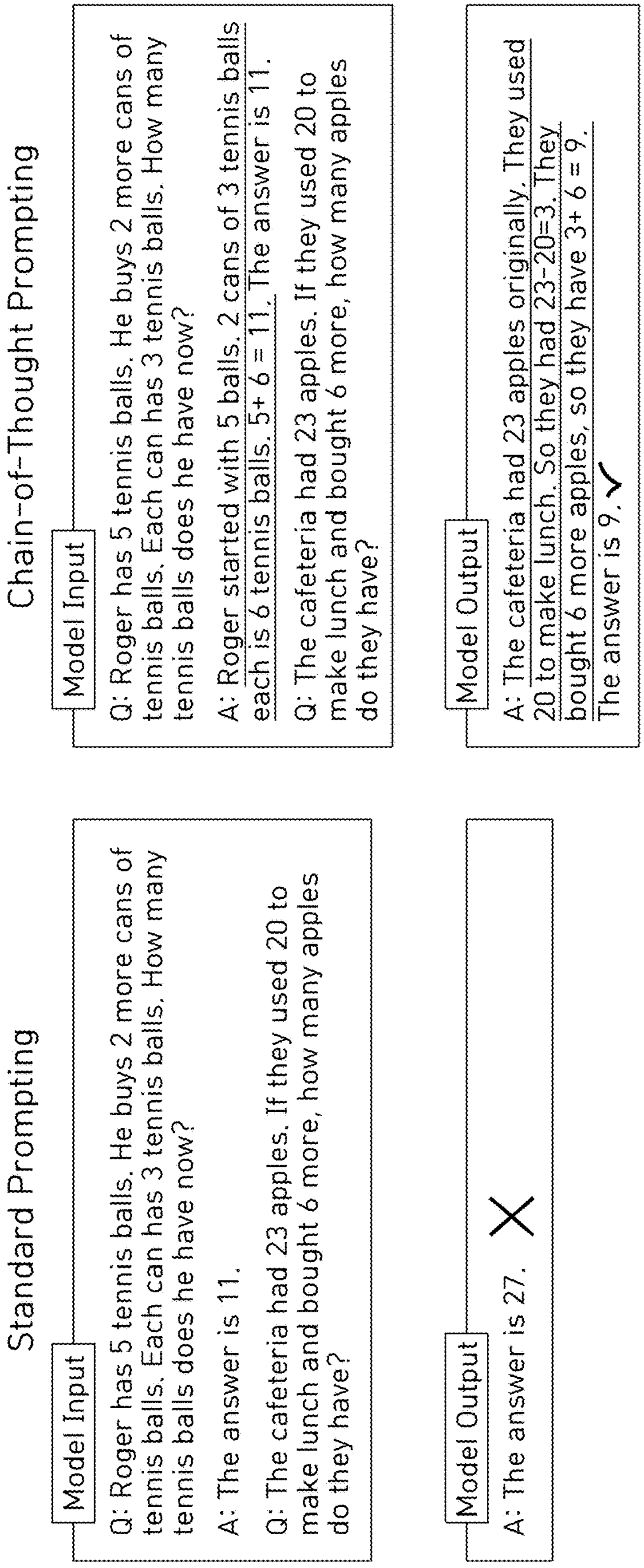
FIG. 1 RELATED ART
FIG. 1 is a diagram in which model inputs and outputs of an existing prompting method and a chain-of-thought (CoT) prompting method are compared.
Figure 2:
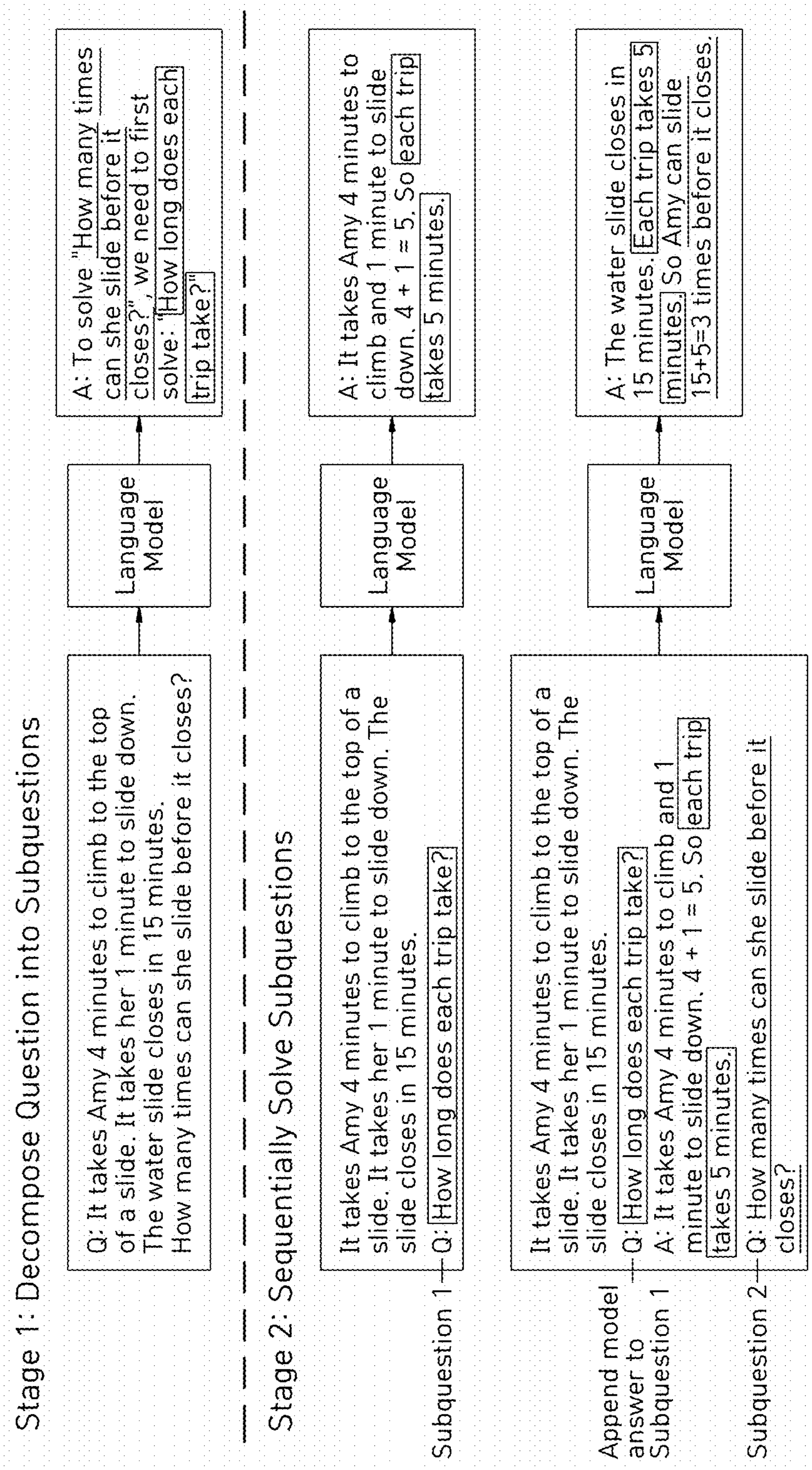
FIG. 2 RELATED ART
FIG. 2 is an example diagram of complex reasoning employing problem decomposition.
Figure 4:
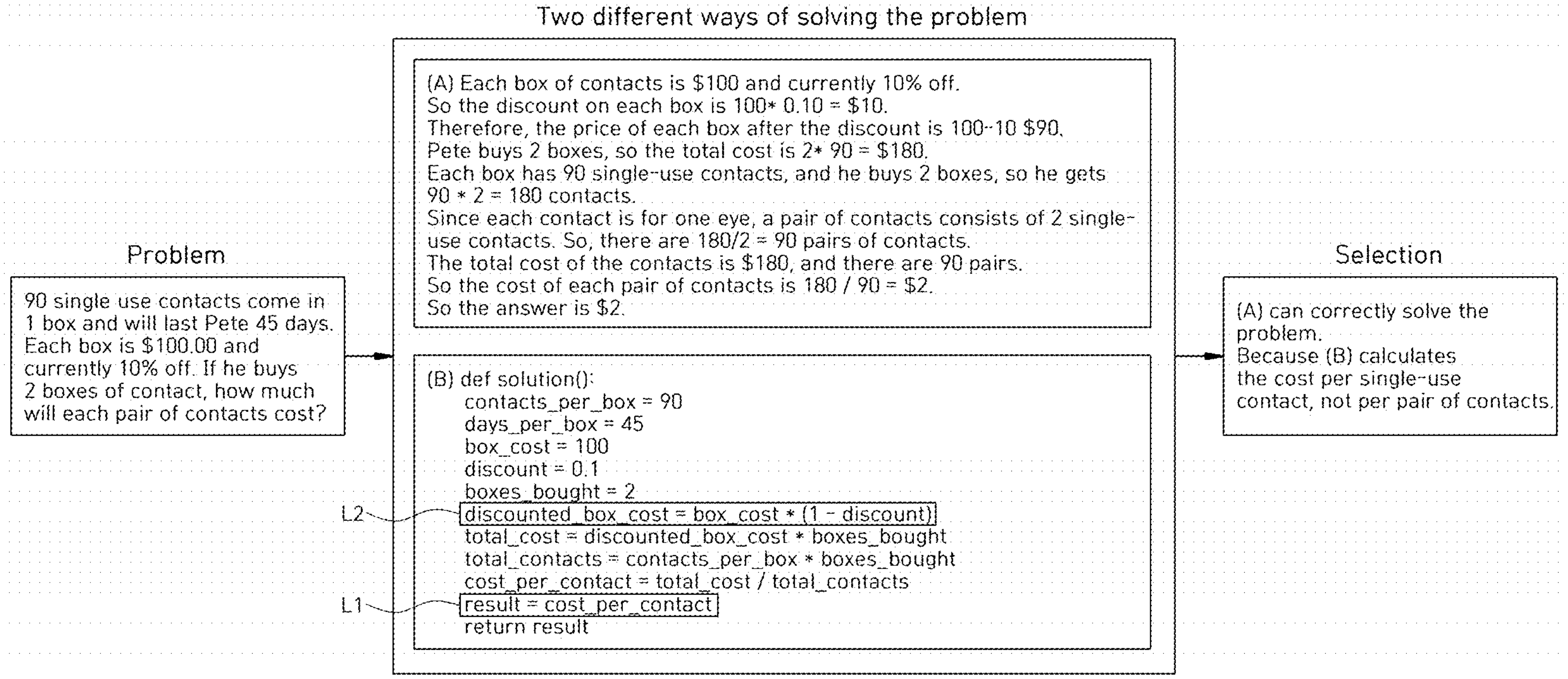
FIG. 4 RELATED ART
FIG. 4 is an example diagram of answering to an inference question.

The present invention relates to a device and method for artificial intelligence (AI) reasoning based on a language model. Specifically, the present invention relates to an AI reasoning device and method that involve, in the case of inferring on the basis of a language model to answer a question, such as a mathematical problem described in a natural language, an operation of correctly understanding the core of the question through an operation of summarizing the question, which is described in the natural language and will be answered, into a program code style or the like, an operation of decomposing the given question into intermediate sub-questions that will be answered for a final answer to the given question, an operation of searching for related knowledge required for answering the question, and an operation of answering the sub-questions. In particular, according to the present invention, question answering performance is improved by correctly understanding a question that will be answered through a question summarization operation.

Advantages and features of the present invention and methods of achieving them will become clear with reference to exemplary embodiments described below in detail in conjunction with the accompanying drawings. However, the present invention is not limited to the embodiments disclosed below and may be implemented in various different forms. The embodiments are provided only to make the disclosure of the present invention complete and fully convey the scope of the present invention to those skilled in the technical field to which the present invention pertains, and the present invention is only defined by the scope of the claims. Terminology used herein is for describing the embodiments and is not intended to limit the present invention. In this specification, singular forms also include plural forms unless specifically stated otherwise. As used herein, "comprise" and/or "comprising" do not preclude the presence or addition of one or more constituent elements, steps, operations, and/or elements other than stated constituent elements, steps, operations, and/or elements.

In describing the present invention, when it is determined that a detailed description of related known technology may obscure the subject matter of the present invention, the detailed description will be omitted.

Hereinafter, exemplary embodiments of the present invention will be described in detail with reference to the accompanying drawings. Throughout the drawings, like reference numerals will be used for like components to facilitate overall understanding of the present invention.

To solve the problems described in [Background], this specification discloses a device and method for AI reasoning based on a language model that involve, in the case of answering an inference question described in a natural language on the basis of a language model, a first operation of summarizing the core of the question, a second operation of decomposing the question into sub-questions, and a third operation of answering the sub-questions and the question.

According to the present invention, the operation of summarizing the core of a question is performed before reasoning for question answering, which allows an AI device to correctly understand information given in the question and leads to a performance improvement. Although several methods may be used to summarize and express the core of a question, a method of summarizing a question into a program code style will be described as an exemplary embodiment of the present invention. An expression method used in summarizing the core of a question may be applied to subsequent operations of decomposing the question into sub-questions and expressing solutions of the sub-questions without any change.

An exemplary embodiment of the present invention to which program code-style expressions of information summaries are applied will be described below. To this end, a reasoning device and method based on a language model involve a first operation of summarizing a question into a code style, a second operation of decomposing the question into sub-questions, a third operation of solving the code-style question, and a fourth operation of solving the question by converting the answer into actual program code.

Existing language model-based reasoning methods employ a chain-of-thought (CoT)-based reasoning method using a natural language, a Program-Aided Language models (PAL)-based reasoning method using code, and a method of applying both the two models and then selecting one of the two models. The present invention proposes a device and method for AI reasoning based on a language model which reflect all the advantages of CoT and PAL and additionally involve a semi-code-style summarization operation to improve a language model's understanding of a question.

Figure 5:
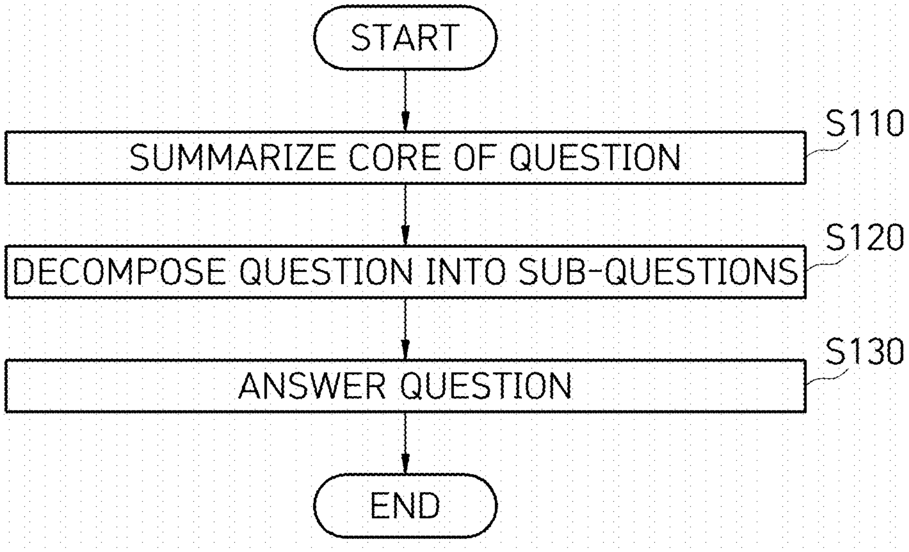
FIG. 5 is a flowchart illustrating a method for artificial intelligence (AI) reasoning based on a language model according to an exemplary embodiment of the present invention.

FIG. 5 is a flowchart illustrating a method for AI reasoning based on a language model according to an exemplary embodiment of the present invention.

The method for AI reasoning based on a language model according to the exemplary embodiment of the present invention includes operation S110 of summarizing the core of a question, operation S120 of decomposing the question which is given in a natural language (hereinafter "natural language question") into sub-questions, and operation S130 of answering the question. The method for AI reasoning based on a language model illustrated in FIG. 5 is in accordance with the exemplary embodiment, and operations of the method for AI reasoning based on a language model according to the present invention are not limited thereto. Operations of the method may be added, changed, or removed as necessary.

Each operation will be described in detail below. For convenience of description, each operation is assumed to be performed by a device 1000 for AI reasoning based on a language model according to the present invention.

Operation S110 is an operation of summarizing the core of a question. In this operation, a question core summary is generated using a language model which is trained in advance on the basis of natural language questions.

The device 1000 for AI reasoning based on a language model receives a natural language question from an external device or a user. The device 1000 for AI reasoning based on a language model generates a question core summary by inputting the natural language question to the language model. Specifically, the question core summary may be expressed as a semi-code-style summary or a code-style summary.

When a natural language question shown in FIG. 6, specifically, a mathematical problem described in a natural language, is given, according to the existing PoT or PAL-based method, the question is input to a language model for reasoning, and Phyton code shown in FIG. 7 is generated as an inference result (Chen et al. 2022. "Program of Thoughts Prompting: Disentangling Computation from Reasoning for Numerical Reasoning Tasks," arXiv:2211.12588).

Each line of Phyton code which is generated using a PoT or PAL technique may be construed as code expressing a reasoning process, which is required for deriving a correct answer to a question that will be answered by a language model. A Python interpreter executes the code and finally generates an inference result to generate a final answer. When the answer obtained through this process is incorrect, there are generally two cases: the first case where the language model incorrectly understands the question and the second case where the language model correctly understands the question but has an error in a reasoning process. However, the existing reasoning models based on a language model process question understanding and inference together without separation, which leads to difficulties in distinguishing between errors of the first and second cases and making a specific improvement.

According to the present invention, in the code-style summarization operation S110 before the language model starts a full reasoning process, the question understood by the language model is summarized into short semi-text which is in the form of code. In this way, the language model can be trained to correctly understand questions described in a natural language (training operation), or it is possible to check whether the language model correctly understands a question described in a natural language (application operation). FIG. 8 shows an example of a result of the same question obtained through the code-style summarization operation S110 of the present invention.

In contrast to the question "Toulouse has twice as many sheep as Charleston. Charleston has 4 times as many sheep as Seattle. How many sheep do Toulouse, Charleston, and Seattle have together if Seattle has 20 sheep?" of FIG. 6, the result of a code-style summary is a line-by-line symbolization, summarization, and organization of the core content of sentences constituting the question, and the form of description is in accordance with a code style. The code-style summary generated in this way expresses the core information of the question in a readable line-by-line manner by decomposing the core information as much as possible, and it is necessary to allow the textual question including the core information required for answering the question (a paraphrased form of the original question) to be reversely generated from the summary code (reverse question generation).

FIG. 9 is a diagram of an example of alignment between a code-style summary generation result of the present invention and a question. As shown in FIG. 9, there is clear alignment between the code-style summary generation result of the present invention and the input question, which may help the language model understand the question better.

Due to this characteristic, it is possible to easily determine whether the language model correctly understands a natural language question from the code-style summarization result, and train the natural language model. Here, a first stage does not include a reasoning operation. FIG. 10 shows Python code generated from the same question using PoT. It is seen from FIG. 10 that, unlike the present invention, the original question is not easy to reversely generate because it is not easy to match an input text with code, and information given in the question is mixed with a reasoning process (sum=Seattle+Charleston+Toulouse) for answering the question.

A method of training the language model (a language model for summarizing the core of a question) used in operation S110 to improve the question understanding ability of the language model will be described.

First, it is necessary to build a corpus of natural language questions (text questions) and corresponding code-style summaries (or semi-code-style summaries). The language model is trained to generate a code-style summary (or semi-code-style summary) on the basis of the corpus when a natural language question is input.

For example, the language model proposed in the present invention may be trained on the basis of the corpus using a multitask learning technique based on the reverse question generation characteristic. In other words, the device 1000 for AI reasoning based on a language model according to the exemplary embodiment of the present invention can improve the language model's code-style summary generation ability and question understanding ability using the multitask learning technique for training of both a first task of receiving a natural language question (text question) and generating a code-style summary and a second task of receiving a code-style summary and generating a natural language question (text question).

As another example, the device 1000 for AI reasoning based on a language model according to the exemplary embodiment of the present invention may train the language model on the basis of the corpus using only the first task of receiving a natural language question (text question) and generating a code-style summary.

The above mathematical problem is not subjected to a multi-step reasoning process and thus is not necessary to be decomposed into sub-questions. However, when it is necessary to answer a question through multi-step reasoning, the present invention involves an operation of decomposing the question into sub-questions.

Referring back to FIG. 5, operation S120 will be described.

In operation S120, the natural language question is decomposed into sub-questions. The device 1000 for AI reasoning based on a language model decomposes the natural language question into one or more sub-questions using a reasoning model on the basis of the question core summary and the natural language question. In the output of sub-question decomposition results, the reasoning model describes only one reasoning operation in one line. In other words, each sub-question corresponds to one reasoning operation. The reasoning model is trained to receive a natural language question and a question core summary (e.g., a code-style summary or a semi-code-style summary) and output a sub-question corresponding to one reasoning operation in one line. The device 1000 for AI reasoning based on a language model may decompose a natural language question into code-style or semi-code-style sub-questions.

FIG. 11 is a diagram of an example of a narrative mathematical problem that will be decomposed into sub-questions. When the mathematical problem of FIG. 11 is given, PAL generates the Python code of FIG. 12 (Zhao et al., Automatic Model Selection with Large Language Models for Reasoning, 2023).

When the Phyton code of FIG. 12 is executed by a Python interpreter, a result of "48" is output. In FIG. 12, information given in the problem is mixed with a reasoning process, and one or more reasoning operations are described in one line. For example, the code "area_remaining=(1−fraction_torn)*area_total" briefly describes a calculation reasoning process including two stages of subtracting a ratio of a torn fraction to the entire paper from one and then multiplying the result by the total area of the paper to calculate the area of the remaining paper.

Unlike this, according to the present invention, information is not mixed, or a reasoning process including several operations is not briefly described. Rather, only one reasoning operation is described if possible. This is because, when the process is briefly described, it may be difficult to find or describe the base of a comparative notification of a human or system's inference error.

Referring back to FIG. 5, operation S130 will be described.

Operation S130 is a question answering operation. In this operation, the device 1000 for AI reasoning based on a language model solves the sub-questions generated in operation S120 and synthesizes solutions of the sub-questions to answer the given natural language question. The solutions of the sub-questions may be in the form of semi-code.

In the process of solving the sub-questions, the device 1000 for AI reasoning based on a language model may utilize a knowledge retrieval system that is installed inside or outside the device 1000 for AI reasoning based on a language model. In other words, the device 1000 for AI reasoning based on a language model may extract a key search word from the sub-questions and acquire the solutions of the sub-questions using the knowledge retrieval system.

Figure 13A:
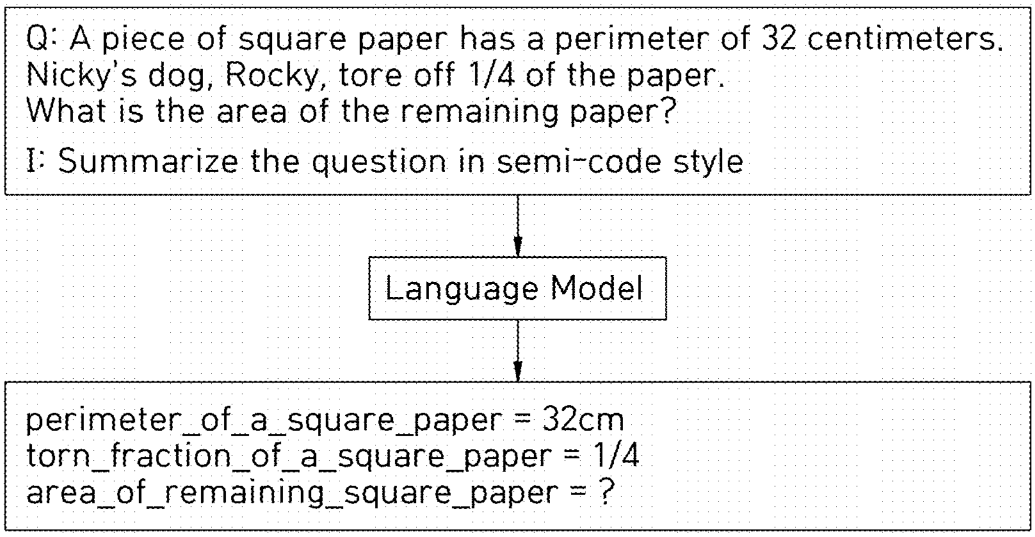
Figure 13B:
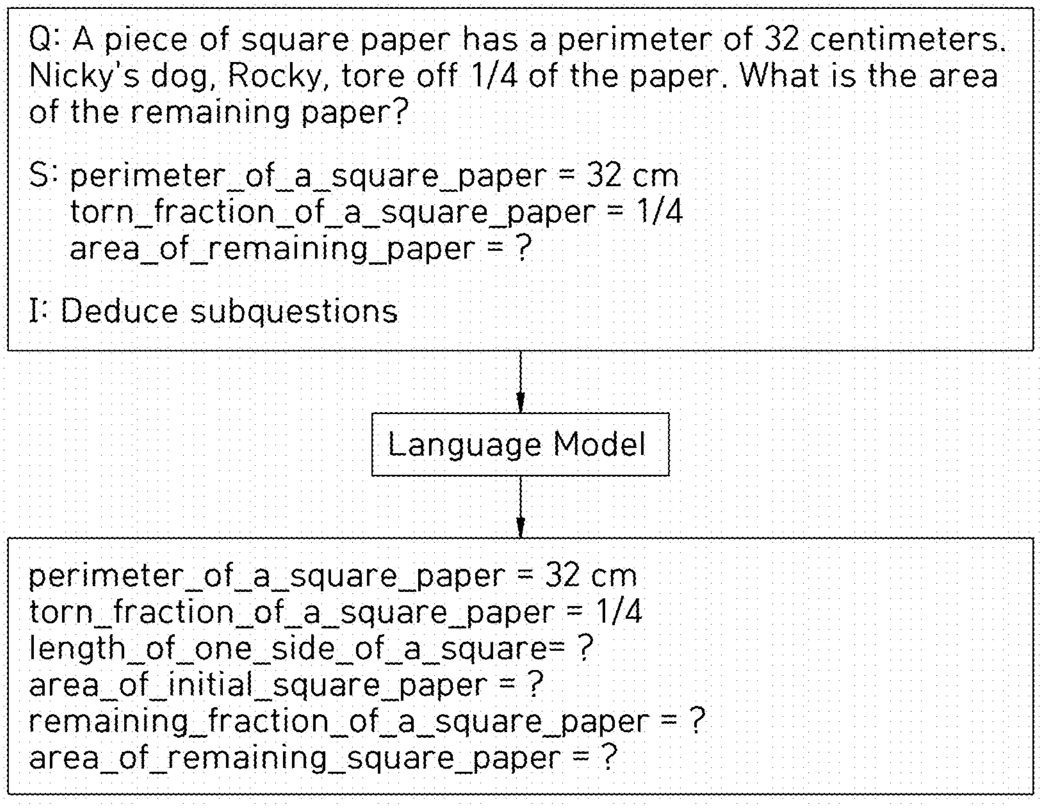

FIGS. 13A to 13C are diagrams of an example of operation-specific reasoning according to the present invention. In other words, FIGS. 13A to 13C are diagrams illustrating operations of a reasoning process for a question according to the present invention. FIG. 13A shows an input and an output of the language model in operation S110, FIG. 13B shows an input and an output of the language model in operation S120, and FIG. 13C shows an input and an output of the language model in operation S130.

In operation S110, the device 1000 for AI reasoning based on a language model may input the natural language question to the language model having the reasoning function of the present invention to generate a semi-code-style summary.

In operation S120, the device 1000 for AI reasoning based on a language model may input the semi-code-style summary, which is the result of operation S110, along with the natural language question to the language model having the reasoning function of the present invention to generate sub-question decomposition results.

In operation S130, the device 1000 for AI reasoning based on a language model may input sub-questions, which are the results of operation S120, along with the natural language question to the language model having the reasoning function of the present invention to generate semi-code-style results obtained by answering the sub-questions using variables given in the semi-code.

FIG. 14 is a diagram of an example of a code-style summary generated through a question core summarization operation according to the present invention. FIG. 14 shows a semi-code-style summary which is output through operation S110, that is, the code-style summarization operation, of the present invention when the question of FIG. 11 is input to the reasoning device of the present invention based on a language model. As shown in FIG. 14, to increase code readability, the summary is not in full accordance with the determined code style of actual program code, for example, a unit displayed behind a number and the like.

Unlike the question of FIG. 6, the question of FIG. 11 does not just involve calculating a sum but involves solving all of a first sub-question about the length of one side of a square, a second sub-question about the original area of the square, a third sub-question about a ratio of the square left untorn to the entire paper, and a fourth sub-question about the area of the square left untorn. After the summarization operation S110, the present invention involves an operation of decomposing the question into sub-questions which is operation S120. FIG. 15 shows a result generated through two stages, and it is seen that sub-questions which are not in FIGS. 13A to 13C are sequentially generated. The sub-questions are also in accordance with a semi-code style.

FIG. 16 is a diagram of an example of semi-code including solutions generated through a question answering operation according to the present invention. FIG. 16 shows a result of inputting a natural language question and sub-question decomposition results to a language model having the reasoning function of the present invention and generating semi-code-style results obtained by answering the sub-questions. The solutions are described using variables given in the semi-code, and external knowledge may be used for the solutions.

The flowchart of FIG. 5 may further include the program code execution operation S140.

In operation S140, the device 1000 for AI reasoning based on a language model converts the solutions (in the form of semi-code) of operation S130 into program code, such as Python code or the like, and executes the program code to generate a final result. In this operation, the device 1000 for AI reasoning based on a language model can correctly process units, which are not processible with PoT and the like according to the related art, by processing unit information such as "$cm^2$" and the like. The present invention is described with an example of narrative mathematical problem but may also be applied to inference questions that require multi-step reasoning.

Since the proposed exemplary embodiment gives semi-code as an example rather than actual program code, an operation of directly changing semi-code to program code may be added when a program-code-style expression method is used. When a question core information summary expression is in the form of actual program code, operation S140 involves actually executing the program code rather than answering through a change to actual program code. Also, when a core information summary expression having the form of text rather than actual program code or semi-code is used, the sub-questions may be answered without performing the program code execution operation S140.

The method for AI reasoning based on a language model has been described with reference to the flowchart shown in the drawing. Although the method has been shown and described as a series of blocks for convenience, the present invention is not limited to the order of blocks. Some blocks may be performed in a different order than shown and described herein or at the same time as other blocks, and various other branches, flow paths, and sequences of blocks that achieve the same or similar results may be implemented. Also, not all the blocks shown in the drawing may be required for implementing the method described herein.

Figure 17:
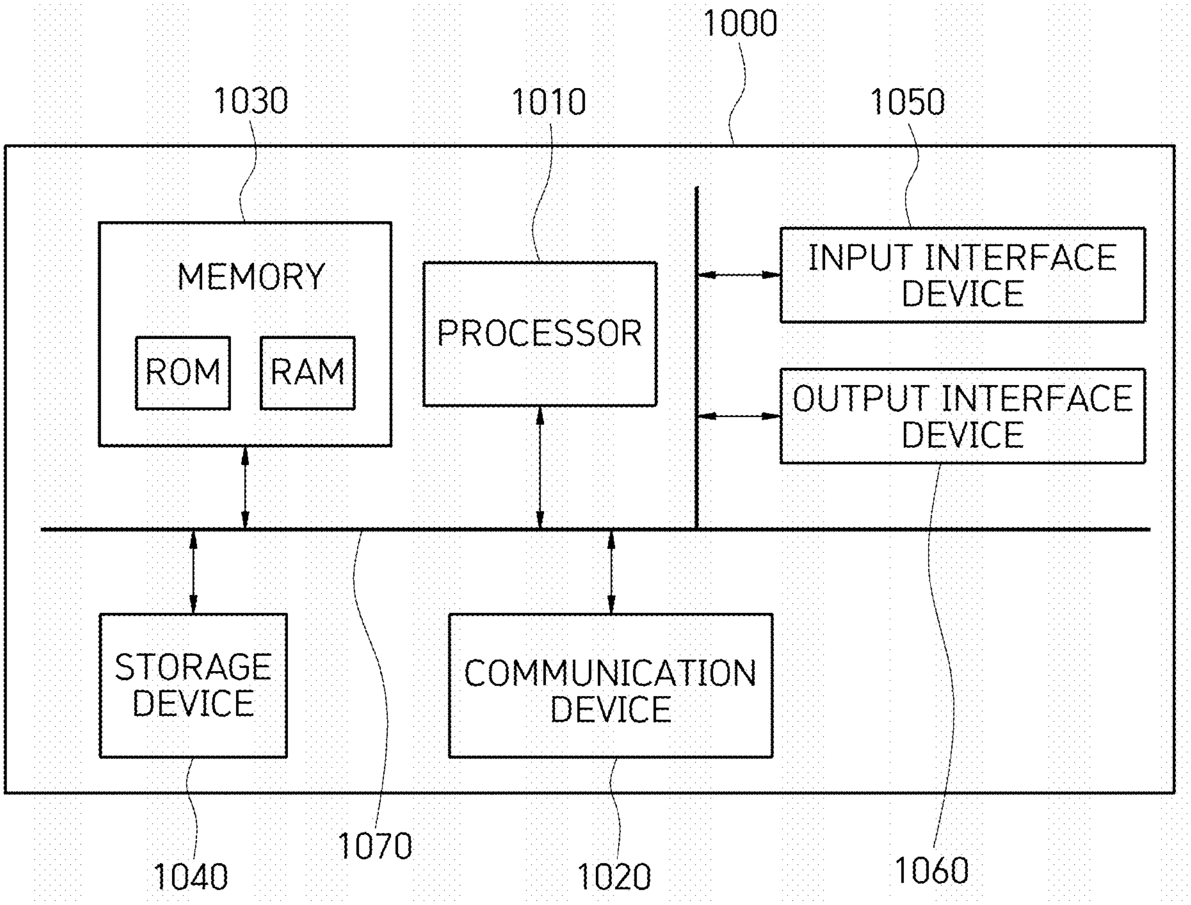
FIG. 17 is a block diagram of a computer system for implementing a reasoning method based on a language model according to an exemplary embodiment of the present invention.

FIG. 17 is a block diagram of a device for AI reasoning based on a language model according to an exemplary embodiment of the present invention. The method for AI reasoning based on a language model according to the exemplary embodiment of the present invention may be performed by a computer system of FIG. 17 such as the device 1000 for AI reasoning based on a language model.

Referring to FIG. 17, the device 1000 for AI reasoning based on a language model may include at least one of at least one processor 1010, a memory 1030, an input interface device 1050, an output interface device 1060, and a storage device 1040 which communicate through a bus 1070. The device 1000 for AI reasoning based on a language model may further include a communication device 1020 connected to a network.

A natural language question is input to the device 1000 for AI reasoning based on a language model through the communication device 1020 or the input interface device 1050 and stored in the memory 1030 or the storage device 1040. The processor 1010 may read the natural language question stored in the memory 1030 or the storage device 1040.

The processor 1010 executes the method for AI reasoning based on a language model according to the present invention. In other words, when instructions stored in the memory 1030 or the storage device 1040 are executed, the processor 1010 generates a question core summary by inputting the natural language question to a pretrained language model, decomposes the natural language question into one or more sub-questions using a reasoning model on the basis of the question core summary and the natural language question, solves the sub-questions, and obtains an answer to the natural language question by synthesizing solutions of the sub-questions. The question core summary may be a code-style summary or a semi-code-style summary. Each of the sub-questions corresponds to one reasoning operation. The solutions of the sub-questions may be in the form of semi-code. In this case, the processor 1010 may convert the solutions of the sub-questions into program code and execute the program code to generate a final result. The processor 1010 may process unit information in the process of generating the final result.

Details of functions of the processor 1010 may be understood from the description of FIGS. 5 to 16.

The processor 1010 may be a central processing unit (CPU) or a semiconductor device that executes instructions stored in the memory 1030 or the storage device 1040.

The memory 1030 or the storage device 1040 stores computer-readable instructions. The memory 1030 or the storage device 1040 may include various forms of volatile or non-volatile storage media. For example, the memory 1030 may include a read-only memory (ROM) and a random-access memory (RAM). According to embodiments of the present disclosure, the memory 1030 may be positioned inside or outside the processor 1010 and connected to the processor 1010 through various well-known devices. The memory 1030 is one of various forms of volatile or non-volatile storage media. For example, the memory 1030 may include a ROM or RAM.

Therefore, an exemplary embodiment of the present invention may be implemented as a method by a computer or as a non-transitory computer-readable medium in which computer-executable instructions are stored. In an exemplary embodiment, when executed by the processor 1010, the computer-readable instructions may perform a method according to at least one aspect of the present disclosure.

The communication device 1020 may transmit or receive a wired signal or wireless signal.

Also, a method according to the present invention may be implemented in the form of program instructions that are executable by various computing devices and recorded on a computer-readable medium.

The computer-readable medium may include program instructions, data files, data structures, and the like solely or in combination. The program instructions recorded on the computer-readable medium may be specially designed and prepared for embodiments of the present invention or may be instructions which are well-known and available to those skilled in the field of computer software. The computer-readable medium may include a hardware device configured to store and execute the program instructions. Examples of the computer-readable medium may be magnetic media, such as a hard disk, a floppy disk, and magnetic tape, optical media, such as a compact disc ROM (CD-ROM) and a digital versatile disc (DVD), magneto-optical media, such as a floptical disk, and hardware devices such as a ROM, a RAM, a flash memory, and the like. Examples of the program instructions include machine code generated by a compiler and high-level language code that is executable by a computer using an interpreter or the like.

Meanwhile, even when omitted in the description of FIG. 17, the descriptions of FIGS. 5 to 16 may be applied to the device 1000 for AI reasoning based on a language model shown in FIG. 17.

According to the present invention, it is possible to improve a language model-based reasoning device's understanding of a complex inference question described in a natural language by answering the question through an operation of summarizing question key information.

Also, in expressing information and describing a question answering process, the present invention allows key information to be represented by being subdivided as independently as possible if necessary. This increases the reasoning accuracy of a device and makes it possible to accurately identify operation-specific reasoning errors. Accordingly, the present invention can be applied to the field of tutoring such as AI tutors.

Effects of the present invention are not limited to those described above, and other effects that are not described will be clearly understood by those of ordinary skill in the art from the above description.

Although exemplary embodiments of the present invention have been described above, those skilled in the art will understand that various modifications and alterations can be made without departing from the spirit and scope of the present invention stated in the following claims.

What is claimed is:

1. A computer-implemented method for artificial intelligence (AI) reasoning based on a language model, the method comprising:

inputting, by at least one processor, a natural language question to a pretrained language model to generate a question core summary, wherein the question core summary is a semi-code-style summary including variables corresponding to core information extracted from the natural language question, and wherein the semi-code-style summary represents information explicitly given in the natural language question separately from a reasoning process for answering the natural language question;

decomposing, by the at least one processor, the natural language question into one or more sub-questions using a reasoning model by inputting both the semi-code-style summary and the natural language question to the reasoning model, wherein each of the one or more sub-questions corresponds to one reasoning operation; and solving, by the at least one processor, the one or more sub-questions and synthesizing solutions of the one or more sub-questions to obtain an answer to the natural language question.

2. The method of claim 1, wherein the semi-code-style summary includes a plurality of lines, each line representing a corresponding core information element extracted from the natural language question.

3. The method of claim 1, wherein the semi-code-style summary is generated without including a reasoning operation for deriving the answer to the natural language question.

4. The method of claim 1, wherein the solutions are in a form of semi-code.

5. The method of claim 4, further comprising generating a final result by converting the solutions into program code and executing the program code.

6. The method of claim 5, wherein the executing of the program code to generate the final result comprises processing unit information.

7. A device for artificial intelligence (AI) reasoning based on a language model, the device comprising:

a memory configured to store computer-readable instructions; and at least one processor configured to execute the instructions, wherein, when the instructions are executed, the at least one processor:

inputs a natural language question to a pretrained language model to generate a question core summary, wherein the question core summary is a semi-code-style summary including variables corresponding to core information extracted from the natural language question, and wherein the semi-code-style summary represents information explicitly given in the natural language question separately from a reasoning process for answering the natural language question;

decomposes the natural language question into one or more sub-questions using a reasoning model by inputting both the semi-code-style summary and the natural language question to the reasoning model, wherein each of the one or more sub-questions corresponds to one reasoning operation; and solves the one or more sub-questions, and obtains an answer to the natural language question by synthesizing solutions of the one or more sub-questions.

8. The device of claim 7, wherein the semi-code-style summary includes a plurality of lines, each line representing a corresponding core information element extracted from the natural language question.

9. The device of claim 7, wherein the semi-code-style summary is generated without including a reasoning operation for deriving the answer to the natural language question.

10. The device of claim 7, wherein the solutions are in a form of semi-code.

11. The device of claim 10, wherein the at least one processor converts the solutions into program code and executes the program code to generate a final result.

12. The device of claim 11, wherein the executing of the program code to generate the final result comprises processing unit information.

* * * * *